July 1, 1930.  M. E. REAGAN  1,768,788
MOTOR STARTING SYSTEM
Filed Nov. 2, 1927   2 Sheets-Sheet 2

INVENTOR
Maurice E. Reagan
BY
ATTORNEY

Patented July 1, 1930

1,768,788

UNITED STATES PATENT OFFICE

MAURICE E. REAGAN, OF SWISSVALE, PENNSYLVANIA, ASSIGNOR TO WESTINGHOUSE ELECTRIC & MANUFACTURING COMPANY, A CORPORATION OF PENNSYLVANIA

MOTOR-STARTING SYSTEM

Application filed November 2, 1927. Serial No. 230,465.

This invention pertains to a system for automatically starting an electric motor, specifically an alternating-current motor of the synchronous type. Motors of this type are widely employed in automatic and semi-automatic stations and it is obviously desirable that means be provided whereby such motors can be started automatically or from a remote control point.

An object of my invention is to provide a system utilizing the V-curve characteristic of the armature current during starting conditions and during the initial excitation of the field magnets as an indication of proper time for transferring from starting to running connections.

Another object of my invention is to provide a system in which the rising portion of the V-curve of the armature current is utilized to determine the proper time to transfer from starting to running connections.

Another object of my invention is to provide a starting system which will enable the motor to exert a high starting torque.

Another object of my invention is to control the voltage of a direct-connected generator which supplies current to the motor field, in accordance with the starting current of the motor.

Another object of my invention is to limit the voltage generated by the exciter during the starting period to approximately the same percentage of its normal value as the starting armature voltage is of its normal value.

A still further object of my invention is to arrange a starting system for motors in which the motor is started on low voltage and transferred to normal operating voltage when the motor starting current increases in response to an increased field current.

My invention may be more fully understood by reference to the accompanying drawings which illustrate a single embodiment of my invention.

Figure 1:
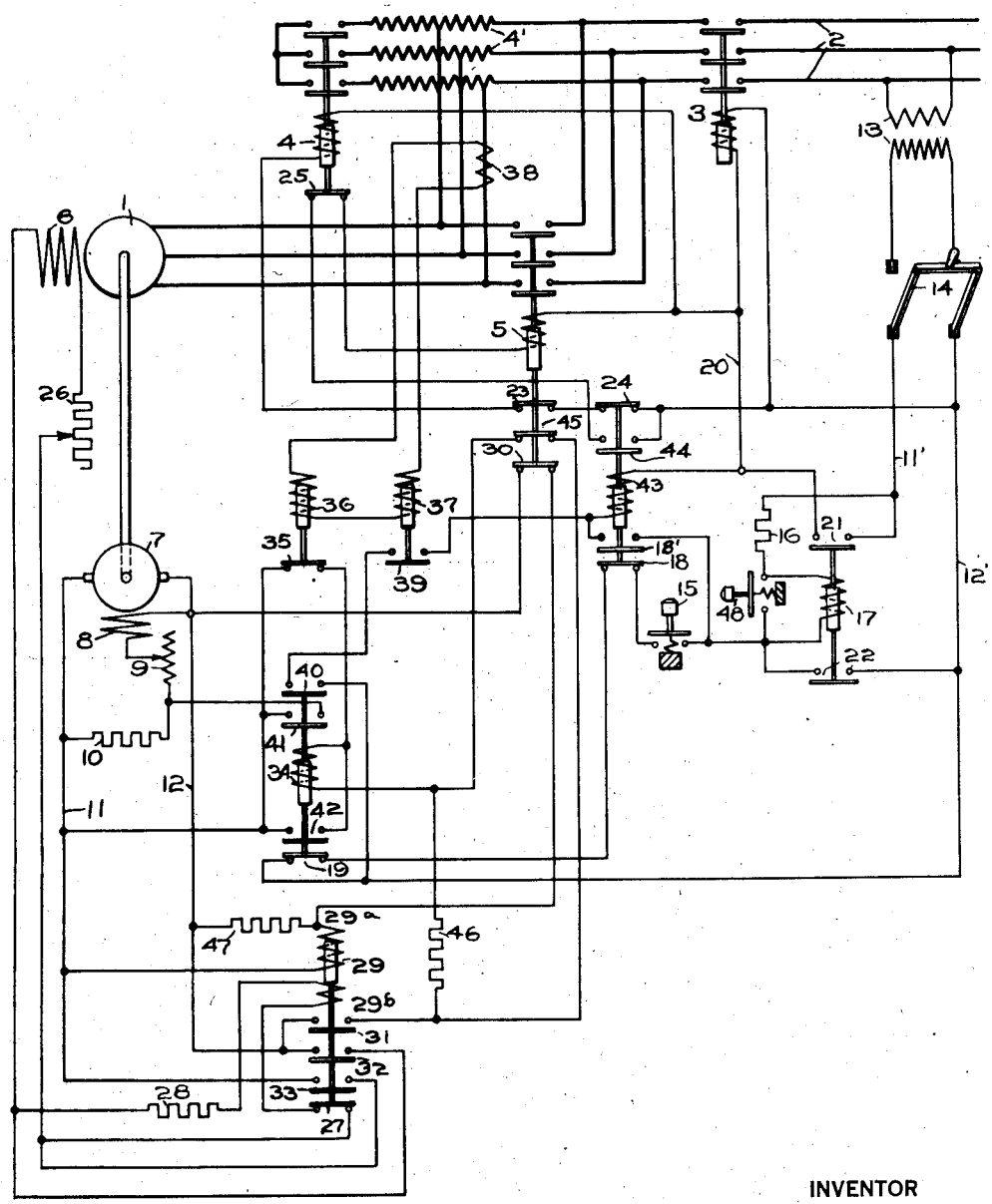
Figure 1 shows a circuit diagram of the system for starting synchronous motors as contemplated by my invention.

In Fig. 1, the synchronous motor 1 is supplied with energy from a source of alternating current 2, through a main circuit breaker 3, a starting switch 4 and auto-transformers 4'. A running switch is indicated at 5. The motor 1 is provided with the usual field winding 6.

Directly connected to the shaft of the motor 1 is the armature of a generator 7 having a shunt field winding 8, the circuit of which includes a rheostat 9 and a resistor 10. The generator 7 energizes control busses 11 and 12 to actuate various direct-current control devices, as will be further explained hereinafter.

A transformer 13, connected to one phase of the supply 2, furnishes current for operating the starting and running switches, as well as the main circuit breaker 3 and other alternating-current control equipment. A switch 14 controls the energization of alternating current control busses 11' and 12' from the transformer 13.

The operation of my starting system will now be described and the remaining elements and their functions will be pointed out as the description proceeds.

The starting of the motor 1 is controlled by a single switch 15 which is illustrated as a push-button switch, although it is to be understood that this switch may be operated automatically in response to any desired conditions, or it may be operated from a distance by means of a suitable system of remote control.

The closing of the switch 15 completes a circuit from the alternating-current control bus 11' through a resistor 16, the operating coil of a relay 17, the switch 15, a contact 18 of a relay 43, a contact 19 of a relay 34, and thence back to the alternating-current control bus 12'. The energization of the operating coil of relay 17 causes the relay to operate to close its contacts 21 and 22. The contact 22 completes a locking circuit from the operating coil of the relay 17 to the control bus 12', shunting the switch 15 and contacts 18 and 19.

The closing of the contact 21 energizes an auxiliary control bus 20, which causes the operation of the main circuit breaker 3 to connect the starting transformers 4' to the alternating-current source 2. Simultaneously, the starting switch 4 is operated because of the energization of its closing coil, the circuit including the auxiliary bus 20, the operating coil of the starting switch 4, contacts 23 of running switch 5, which is closed when the switch 5 is opened, and contact 24 of the relay 43, which is closed when the relay 43 is deenergized.

Upon the closing of the main circuit breaker 3 and the starting switch 4, a reduced voltage is applied to the armature of the motor 1, which starts in the well known manner. A current transformer 38 connected to one of the starting leads, energizes the operating coils of relays 36 and 37, the functions of which will become apparent, in accordance with the motor starting current.

Upon starting, the circuit of the field winding 6 of the motor 1 is closed through a rheostat 26, a contact 27 which is closed when the relay 29 is deenergized, an operating coil 29b of the relay 29, and a resistor 28. The coil 29b serves to maintain the contacts of relay 29 in the lower position until the current induced in the motor field at starting is reduced to a predetermined value. The field circuit of the generator likewise includes a rheostat 9, and a resistor 10 of such value that at normal speed the generator voltage is limited to approximately the same percentage of its normal value as the motor-starting voltage is of its normal value.

The operating coil 29a of the relay 29 is connected across the control busses 11 and 12 through the contact 30 of the running switch 5, which is closed when the latter is open. As the motor approaches synchronous speed, the induced field current decreases, deenergizing coil 29b, and the generator voltage increases to a value below normal, but yet sufficient to energize the coil 29a to cause operation of the relay 29, closing the contacts 31, 32 and 33 and opening the contact 27. The opening of the contact 27 opens the circuit of the motor field 6 and the closing of contacts 32 and 33 connects the field to the generator busses 11 and 12. A reduced field current thereupon circulates through the field winding 6.

The closing of the contact 31 completes a circuit from the bus 12 through the contact 31, through the contact 45, which is closed when the switch 5 is opened, through the operating coil of a relay 34, through contact 35 of relay 36 and thence to the bus 11. As above stated, the relay 36 is energized in accordance with the motor-starting current by means of current transformer 38. At the beginning of the starting cycle, the starting current is large and the relay 36 is energized and contact 35 is opened. As the motor approaches synchronous speed, however, the starting current decreases and the relay 36 is energized less and the contact 35 is closed, completing the circuit above outlined.

Figure 3:
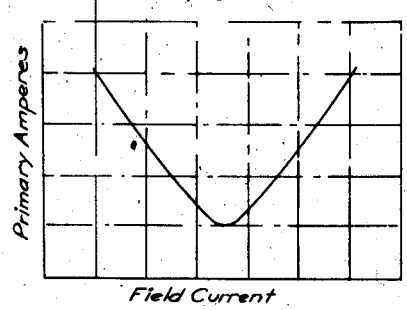
Fig. 3 is a curve illustrating a well known characteristic of the armature current in synchronous motors during starting conditions and during initial excitation of the field magnets.

Upon completion of this circuit the operating coil of the relay 34 is energized and the contacts 40, 41 and 42 are closed, and contact 19 is opened. The opening of the contact 19 has no effect upon the remainder of the circuit since, as previously stated, it was shunted by the closing of contact 22 of the relay 17. The closing of the contact 42 completes a locking circuit in parallel with the contacts of relay 35, so that the energization of the relay 34 is now independent of the value of the armature current while the starting connection is maintained. The closing of the contact 41 completes a circuit in parallel with the resistor 10 in the field circuit of the generator. The short-circuiting of the resistor 10 causes an increase in the generator field current and a consequent increase in the generator voltage. This causes a greater current to flow through the motor field winding and as a consequence thereof, the current supplied to the motor armature is increased in accordance with the well-known V-curve, as illustrated in Fig. 3.

The closing of the switch 40 by the operation of relay 34 and the closing of contact 39 of relay 37, which results from the increased current supplied to the motor beyond the low point of the V-curve, complete a circuit from the auxiliary bus 20 through the operating coil of the relay 43, through the contacts 39 and 40 and thence to the bus 12'. The contact 35 is opened simultaneously with the closing of contact 39, but the contact 42 of relay 34 being in parallel with contact 35, maintains the circuit to the operating coil of relay 34.

The energization of the coil of relay 43 results in the opening of contacts 24 and 18, and the closing of contacts 44 and 18'. The opening of the contact 18 has no effect upon the circuit since it is shunted by the contact 22 of relay 17. Contact 18' completes an obvious locking circuit for the relay 43. The opening of contact 24 interrupts the circuit including the coil of the starting switch 4 which is thereupon opened. The contact 25 is closed when the starting switch 4 is opened and cooperates with the contact 44, closed by the operation of the relay 43, to establish a circuit from the control bus 12' through contacts 44 and 25, the coil of running switch 5 and thence to the bus 20. The establishment of this circuit results in the operation of the running switch 5, which closes its main contacts and connects the motor 1 directly to the supply source 2 through the main circuit breaker 3. The operation of the running switch 5 also opens contacts 23, 45 and 30. The opening of the contact 23 further interrupts the circuit to the coil of starting switch 4, to insure that the starting and running switches cannot be simultaneously closed. The opening of switch 45 removes the short-circuit from across the resistor 46 and the circuit of the operating coil of relay 34 thereafter includes the resistor 46, which is so designed that sufficient current passes through ths circuit to maintain the relay 34 energized. The opening of the contact 30 similarly removes a short-circuit from around the resistor 47 which is thereafter in series with the coil of relay 29, and is designed to permit sufficient current to pass therethrough to maintain the latter in the energized condition.

It will thus be apparent that according to my invention a synchronous motor directly connected to a generator, is started on reduced voltage, with the motor field windings short-circuited through a resistor and with a resistor in the circuit of the generator field, and that the resistor in the generator field circuit is short-circuited in response to the decrease in the motor-starting current as the motor approaches synchronous speed. It will further be seen that the increased motor excitation resulting from the short-circuiting of the generator field resistor causes an increased starting current to flow, in response to which the motor is transferred from the low voltage starting source to its full voltage running source.

When it is desired to stop the motor, it is merely necessary to close the switch 48 which may be operated manually, automatically or by supervisory control, to short-circuit the coil of the relay 17. When the relay 17 is deenergized and the contacts 21 and 22 are opened, the auxiliary bus 20 is disconnected from the bus 11' and the closing coil of the circuit breaker 3 is deenergized disconnecting the motor 1 from the energy source 2. The closing coil of the running switch 5 is similarly deenergized and as the motor slows down, the relays 34 and 29 become deenergized and all the relays and contactors return to their deenergized positions, whereupon the system is ready for a repetition of the starting cycle.

One of the chief advantages of my system, as above described, is that by the shunting of the motor field through a resistor during the starting period and by applying reduced voltage to the motor field when the motor approaches synchronous speed, a very high starting torque is obtained.

Another advantage is that the transfer from starting to running voltage is effected only after the motor-armature current increases in response to increased excitation.

Figure 2:
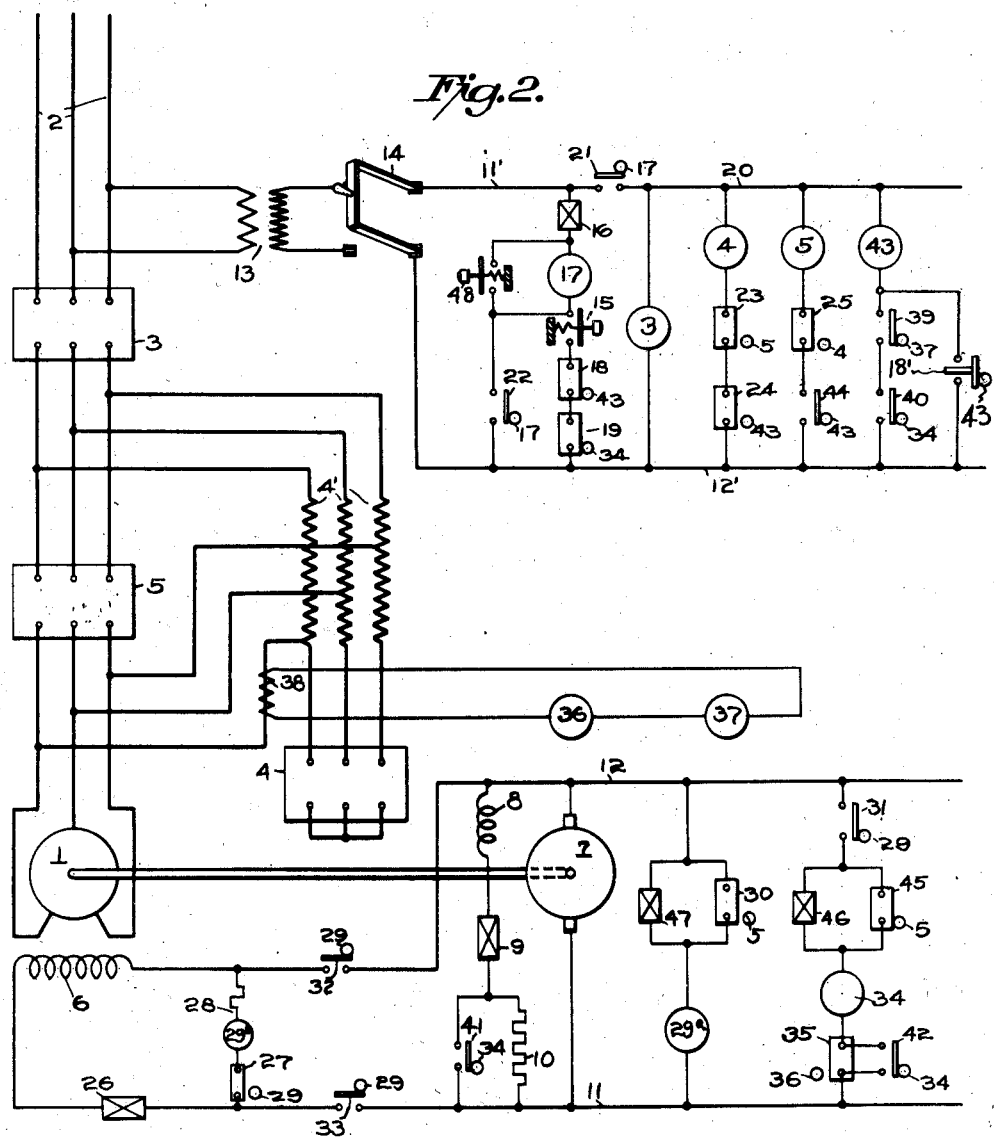
Fig. 2 illustrates a schematic diagram of the circuit shown in full in Fig. 1.

Fig. 2 which illustrates schematically all the relays and contacts of the complete circuit in the conventional manner, will not be described in detail since the above description of the complete circuit shown in Fig. 1 may also be read in connection with the schematic diagram shown in Fig. 2, the corresponding elements of both circuits being indicated by identical reference numerals.

I claim as my invention:

1. A starting system for a synchronous motor comprising a low-voltage starting source and a full-voltage running source, means for connecting the motor armature to the low-voltage source while the field winding is shunted, means for opening the shunt across the field winding and applying reduced voltage to the field winding when the motor reaches approximate synchronous speed, means for increasing the motor field current and means for transferring the armature to the full-voltage source in response to the increase in armature current resulting from the increased motor field current.

2. A starting system for a synchronous motor comprising a low-voltage starting source, a full-voltage running source, an exciter driven by the motor for energizing the field winding of the latter, means for shunting the motor field winding, means for connecting the motor armature to said starting source, means for opening the shunt across the field winding and connecting the motor field winding to the exciter when the motor reaches near synchronous speed, means for increasing the exciter voltage to increase the motor field current, and means for transferring the armature to said running source in response to the increase in armature current resulting from the increased field current.

3. The combination, in a starting system for a synchronous motor, with a low-voltage starting source and a high-voltage running source, and an exciter for energizing the motor field, winding of means for connecting the motor armature to said low-voltage source, a field resistor, means for shunting the motor field winding through the field resistor, means for opening the shunt across the field winding and applying the exciter voltage thereto, means for controlling the motor field current in accordance with the starting current, and a relay responsive to the armature current for connecting the motor to said high-voltage source when the armature current increases as a result of increased field current.

4. The method of starting a motor having a field winding, on low voltage and transferring it to a source of normal operating voltage which comprises shunting the motor field winding at starting, opening the shunt and applying to the field an exciter voltage proportional to the motor speed when the motor approaches synchronous speed, and controlling the transfer of the motor to the running voltage source in accordance with the increase in armature current resulting from the increased field current.

5. The method of starting a motor having a field winding, which comprises shunting the field winding through a resistor, connecting the armature to a source of reduced voltage, removing the shunt from the field winding and applying thereto the voltage generated by an exciter driven by the motor when the motor approaches synchronous speed, and transferring the armature to a source of normal operating voltage when the armature current increases as a result of the increased field current.

6. In a starting system for a synchronous motor, a low-voltage starting and a full-voltage running source, starting and running contactors for connecting the motor armature thereto, a field contactor which, when open, shunts the motor field winding and when closed, connects the motor field winding to an exciter the field circuit of which includes a resistor, means for closing the starting contactor and means for closing the field contactor when the motor reaches synchronous speed, a relay responsive to starting current for shunting the resistor in the exciter field circuit to increase the exciter voltage and the motor field current when the starting current has decreased to a predetermined value, and a relay responsive to armature current for opening the starting contactor and closing the running contactor when the armature current increases as a result of the increased field current.

7. In a starting system for a synchronous motor, a low-voltage starting source and a full-voltage running source, a generator connected to said motor, having a resistor in its field circuit, means for connecting the motor to said low-voltage source, means for shunting said resistor when the armature starting current decreases to a predetermined value to increase the generator voltage, and means for transferring the motor to said full-voltage source when the armature current again increases to a predetermined value.

8. In a starting system for a synchronous motor provided with armature and field windings, a low-voltage starting source and a high-voltage running source for the motor, starting and running switches for the motor, an exciter for supplying excitation current to the field windings, means responsive to a predetermined decrease in the induced field current when the motor is on the starting connection for rendering said exciter effective to energize the motor field at reduced voltage, means responsive to a predetermined reduction in the motor starting current for causing the exciter to develop a high voltage, and means responsive to the increased motor-starting current which flows as a result of the increased exciter voltage for effecting an opening operation of the starting switch and a closing operation of the running switch.

9. In a starting system for a synchronous motor provided with armature and field windings, a low-voltage starting and full-voltage running source, starting and running switches for connecting the motor armature to said sources, an exciter for energizing the motor field winding, a relay for connecting the exciter to the motor field winding, said relay being maintained in an open position until the induced field current which flows when the starting connection is made decreases to a predetermined value, a relay responsive to the decrease of the starting current to a predetermined value for increasing the exciter voltage, and a transfer relay responsive to a predetermined rise in motor current resulting from the increased excitation for effecting an opening operation of the starting switch and a subsequent closing operation of the running switch.

In testimony whereof, I have hereunto subscribed my name this 26th day of October, 1927.

MAURICE E. REAGAN.